(12) United States Patent
Adachi

(10) Patent No.: US 11,568,557 B2
(45) Date of Patent: Jan. 31, 2023

(54) PERSON COUNTING IMAGE PROCESSING APPARATUS, METHOD, AND STORAGE MEDIUM

(71) Applicant: CANON KABUSHIKI KAISHA, Tokyo (JP)

(72) Inventor: Takashi Adachi, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 78 days.

(21) Appl. No.: 17/090,148

(22) Filed: Nov. 5, 2020

(65) Prior Publication Data
US 2021/0174532 A1 Jun. 10, 2021

(30) Foreign Application Priority Data
Dec. 9, 2019 (JP) .............................. JP2019-222310

(51) Int. Cl.
| | |
|---|---|
| *G06T 7/62* | (2017.01) |
| *G06T 7/11* | (2017.01) |
| *G06T 7/136* | (2017.01) |
| *G06F 17/18* | (2006.01) |
| *G06V 20/52* | (2022.01) |
| *G06V 40/10* | (2022.01) |
| *G06V 10/25* | (2022.01) |

(52) U.S. Cl.
CPC ................ *G06T 7/62* (2017.01); *G06F 17/18* (2013.01); *G06T 7/11* (2017.01); *G06T 7/136* (2017.01); *G06T 2207/20021* (2013.01); *G06T 2207/20076* (2013.01); *G06V 10/25* (2022.01); *G06V 20/53* (2022.01); *G06V 40/103* (2022.01)

(58) Field of Classification Search
CPC . G06T 7/62; G06T 7/136; G06T 2207/20021; G06T 2207/20076; G06T 7/11; G06F 17/18; G06V 40/103; G06V 20/53; G06V 10/25
See application file for complete search history.

(56) References Cited

U.S. PATENT DOCUMENTS

| | | | |
|---|---|---|---|
| 9,794,463 | B2 | 10/2017 | Adachi |
| 10,104,279 | B2 | 10/2018 | Adachi |
| 10,521,673 | B2 * | 12/2019 | Takeda .................. G06V 20/52 |

(Continued)

FOREIGN PATENT DOCUMENTS

JP 2018-022340 A 2/2018

*Primary Examiner* — Kenny A Cese
(74) *Attorney, Agent, or Firm* — Carter, DeLuca & Farrell LLP

(57) ABSTRACT

To improve calculation efficiency by properly reducing the number of regression regions based on a size of an object to be detected, a processing apparatus has at least one processor or circuit configured to function as: a size obtain unit configured to obtain a size of a predetermined object in the image; a set unit configured to divide the image into a plurality of regions based on the size of the predetermined object obtained by the size obtain unit, and to set regression regions for estimating a number of the predetermined object, wherein the set unit is configured to inhibit to set the regression regions smaller than a predetermined minimum size corresponding to the predetermined object, and an estimate unit configured to estimate the number of the predetermined object by performing a regression process on the regression regions set by the set unit.

8 Claims, 4 Drawing Sheets

(56) References Cited

U.S. PATENT DOCUMENTS

| | | | |
|---|---|---|---|
| 2009/0010490 A1* | 1/2009 | Wang | G06T 7/292 |
| | | | 382/103 |
| 2015/0178571 A1* | 6/2015 | Zhang | G06V 20/54 |
| | | | 382/103 |
| 2017/0278264 A1* | 9/2017 | Liu | G06T 7/20 |
| 2018/0186349 A1* | 7/2018 | Kim | B60W 30/0953 |
| 2018/0220065 A1* | 8/2018 | Kobayashi | H04N 5/23222 |
| 2020/0184205 A1 | 6/2020 | Yamasaki et al. | |
| 2020/0372259 A1 | 11/2020 | Adachi et al. | |

* cited by examiner

PERSON COUNTING IMAGE PROCESSING APPARATUS, METHOD, AND STORAGE MEDIUM

BACKGROUND OF THE INVENTION

Field of the Invention

The present invention relates to an image processing apparatus and so on.

Description of the Related Art

Recently, systems for counting a number of people are proposed in which by picking up an image with an image processing apparatus such as an image pickup apparatus and so on, and by analyzing a predetermined region of the image, the number of people in the region is counted.

Using such systems, by detecting congestion and a flow of people in public space, it is expected that congestion in an event space may be solved or evacuation guide may be suitably performed.

As one of methods to count the number of people in an image, Japanese unexamined Patent Application No. 2018-22340 discloses a method where, using a recognition model obtained by machine learning, the number of people within a predetermined region in an image is estimated. Hereinafter, this method is referred to as a regression-based human number estimation method. In addition, a subregion generated in the regression-base number estimation method is dubbed as a regression region.

By using the regression-base number estimation method, it is possible to estimate the number of people even in a case where people are congested in high density or sizes of people are small. However, the regression-base human number estimation method takes long time for analyzation, because it sets small regression regions on a presumption that there may exist a small human body.

In this connection, one of objects of the present invention is to provide an image processing apparatus that has a high calculation efficiency by properly reducing the number of regression regions based on a size of an object to be detected.

SUMMARY OF THE INVENTION

To achieve the object, an image processing apparatus according to one aspect of the present invention comprising: at least one processor or circuit configured to function as: an image obtain unit configured to obtain an image; a size obtain unit configured to obtain a size of a predetermined object in the image; a set unit configured to divide the image into a plurality of regions based on the size of the predetermined object obtained by the size obtain unit, and to set regression regions for estimating a number of the predetermined object, wherein the set unit is configured to inhibit to set the regression regions smaller than a predetermined minimum size corresponding to the predetermined object; and an estimate unit configured to estimate the number of the predetermined object by performing a regression process on the regression regions set by the set unit.

Further features of the present invention will become apparent from the following description of embodiments with reference to the attached drawings.

DESCRIPTION OF THE EMBODIMENTS

Figure 1:
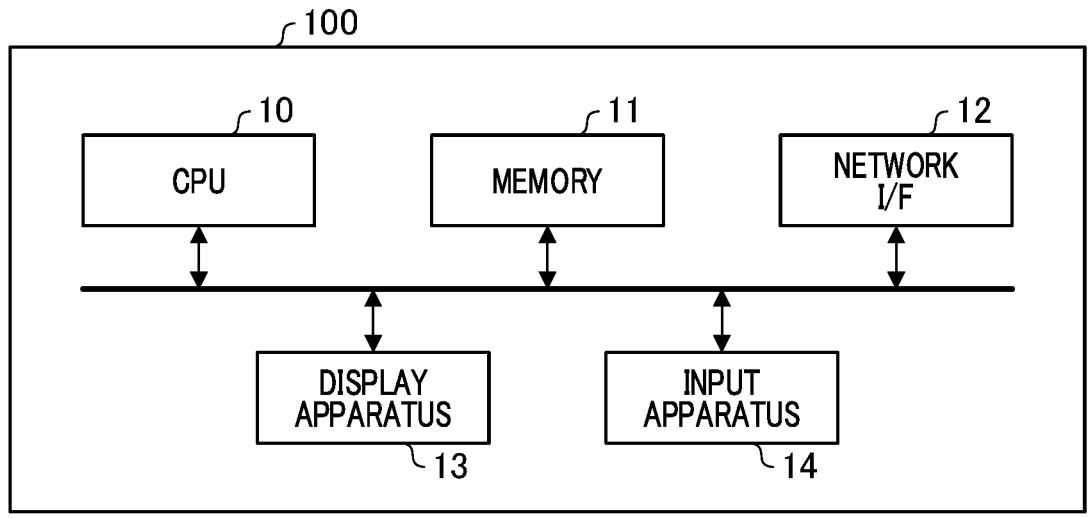
FIG. 1 is a block diagram illustrating an example of a system configuration and a hardware configuration of an image processing apparatus according to an embodiment of the invention.

Preferred embodiments of the present invention will be described below using examples with reference to the accompanying drawings, in each drawing, the same members or constituent elements will be denoted by the same reference numerals and the repeated description thereof will be omitted or simplified.

<Embodiment 1>

FIG. 1 is a block diagram illustrating an example of a system configuration and a hardware configuration of an image processing apparatus 100 according to an embodiment of the invention.

The image processing apparatus 100 is used, for example, as a network camera system.

The image processing apparatus 100 includes, as a hardware configuration a CPU 10 as a computer, memory 11, a network I/F 12, a display apparatus 13, and an input apparatus 14.

The CPU 10 controls entire operation of the image processing apparatus 100. The memory 11 stores computer programs to be used by the CPU 10 and functions as a storage medium.

The Network I/F 12 is an interface for connecting the image processing apparatus 100 to a network. The display apparatus 13 includes a liquid crystal display apparatus, and so on, and displays a result of a process executed by the CPU 10, and so on.

The input apparatus 14 includes a mouse, buttons or the like, and inputs an operation by a user to the image processing apparatus 100. The CPU 10 carries out processes by executing the computer programs stored in the memory 11, so that functional configuration of the image processing apparatus 100 illustrated in FIG. 2 and a process of flowchart illustrated in FIG. 3, which will be explained later, can be realized.

Figure 2:
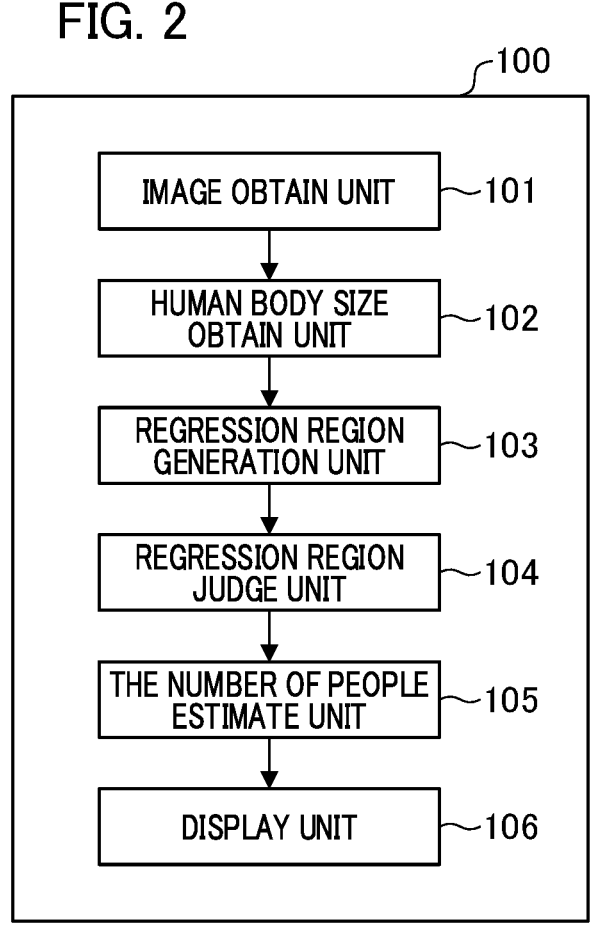
FIG. 2 is a function block diagram of the image processing apparatus according to the embodiment of the invention.

FIG. 2 is a function block diagram of the image processing apparatus according to the embodiment of the invention.

The image processing apparatus 100 includes, as a functional configuration, an image obtain unit 101, a human body size obtain unit 102, a regression region generation unit 103, a regression region judge unit 104, a number of people estimate unit 105 for estimating a number of people, and a display unit 106.

Here, some or all of 101 to 106 may be functional blocks of the CPU 10, discrete electric circuits, a FPGA, or a combination of them.

The image obtain unit 101 is a unit for obtaining an image and the image obtain unit 101 includes, for example, a solid state image sensor such as a CMOS image sensor, a CCD image sensor, and so on.

However, the image obtain unit 101 may obtain images from a network camera via a network, or may obtain images from a memory such as a hard disk.

The human body size obtain unit 102 recognizes humans to be counted in an image and obtains a size of a human body, as a predetermined object.

Here, the size of the human body may be determined and set by a user, for example, using a display apparatus 13, the input apparatus 14, and so on. More specifically, a user may set averaged sizes of human body at a plurality of points in the image, so that averaged sizes of human body in other different positions in the image may be estimated by interpolation.

Or, using methods like a pattern recognition or a machine learning and so on, human body may be automatically detected, so that human body frames each of which indicates a position of human body may be obtained.

In this connection, detecting human body is a process for detecting all or a predetermined part of human body, such as a face.

When a size of the human body frame is denoted as s, and a coordinate of a part of the human body in the images is (x, y), s is assumed to be expressed by x, y, and at least one unknown parameter.

For example, it is assumed that $s=ax+by+c$, where the unknown parameters are a, b, and c.

Here, a, b, and c may be obtained, for example, by a statistical process such as a least squares method, using an aggregation of human body frames obtained from predetermined groups of learning images, so that a size of human body in the image may be automatically estimated.

In addition, those parameters a, b, and c may be dynamically modified according to time zone or situations.

In this connection, methods for obtaining the size of human body are not limited to the above, and any method may be suitably used.

The regression region generation unit 103 functions as a generation unit for generating temporary regression regions with respect to the image.

The regression region generation unit 103 generates temporary regression regions by dividing the image based on a parameter relating to the size of the human body, which is obtained by human body size obtain unit 102, so that a ratio between the size of the temporary regression region and the size of the human body becomes almost constant.

For example, when generating a plurality of temporary regression regions with respect to the image, the regression region generation unit 103 sets a ratio between the size of temporary regression region and the size of the human body within the temporary regression region with respect to each of the temporary regression regions almost constant.

The regression region judge unit 104 functions as a judge unit for judging the size of the temporary regression region generated by the regression region generation unit 103.

In a case where regression regions for detecting the number of human body are set, the regression region judge unit 104 inhibits to set the regression region for estimating the number of the predetermined object to a size smaller than the predetermined size in a case where the judge unit judges that the size of the temporary regression region generated by the generation unit is smaller than the predetermined size.

Here, the predetermined size is determined by multiplying a predetermined coefficient to a predetermined minimum size of human body to be detected (herein after, referred to as a minimum human body size), wherein the minimum human body size may be determined in advance by a user or a minimum human body size among human body sizes obtained by the human body size obtain unit 102 in the image.

Here, a method for calculating the predetermined size will be described in detail. Assuming that a range of the human body size that can be detected in the regression region is n1 times to n2 times of the regression size (n2>n1), the predetermined size can be calculated by multiplying the minimum human body size, for example, by 1/n1 as the predetermined coefficient, which is the inverse of n1.

For example, in a case where a range of the human body size that can be detected in the regression region is 0.16 to 0.24 of the regression size, the size of the temporary regression region is 200 px, and the minimum human body size is 40 px, then the human body size that can be detected in the temporary regression region is 32 px to 48 px, so that the human body smaller than the minimum human body size 40 px can be detected.

Contrary to the above, the predetermined size is calculated as 250 px by multiplying the minimum human body size 40 px by the inverse of 0.16 as the predetermined coefficient.

In the regression region of which size is 250 px, the size of human body that can be detected is 40 px to 60 px, so that human bodies of which size is equal to or larger than the minimum human body size 40 px can be detected.

Assuming that the regression region of which size is smaller than 250 px, human bodies of which size is smaller than the minimum human body size 40 px can be detected, so that smaller objects may be erroneously detected to be counted.

In the present embodiment, when setting the regression region for estimating the number of people, the regression region judge unit 104 inhibits to set the regression region smaller than the predetermined size 250 px, which is calculated by multiplying the minimum human body size 40 px by the predetermined coefficient, so that objects smaller than the minimum human body size will be prevented from being erroneously detected.

The number of people estimate unit 105 estimates the number of people in the regression region by using the known regression-based human number estimation method. As an example, a method using a regression device that inputs a small image of a fixed size and outputs the number of people within the small image is described.

For example, the regression device performs learning in advance based on a known machine learning method such as a support vector machine or deep learning, using a large number of small images with a known number of people as training data. At the time of estimating the number of people, the input image is divided into the regression areas as a unit for estimating the number of people.

Then, by resizing each regression region to a fixed size as an input of the regression device, the number of people in each of the regression region is estimated.

As to the detail of the regression-based human number estimation method, refer to Japanese unexamined Patent Application No. 2018-22340.

The number of people estimated by the number of people estimate unit 105 is not necessarily an integer, and may be a real number. The real number may be rounded to an integer, or may be handled as it is.

In addition, it may be possible to generate regression regions having different sizes in the image by using an estimated value of human body size obtained by the human body size obtain unit 102

The display unit 106 displays a result of the estimation of the number of people estimated by the number of people estimate unit 105 on the display apparatus 13, for example when a predetermined regression region is designated, or the number of people for each regression region may be displayed at the same time. Here, the number of people estimate unit 105 functions as an estimate unit configured to estimate the number of the predetermined object by performing a regression process on the regression regions.

Figure 3:
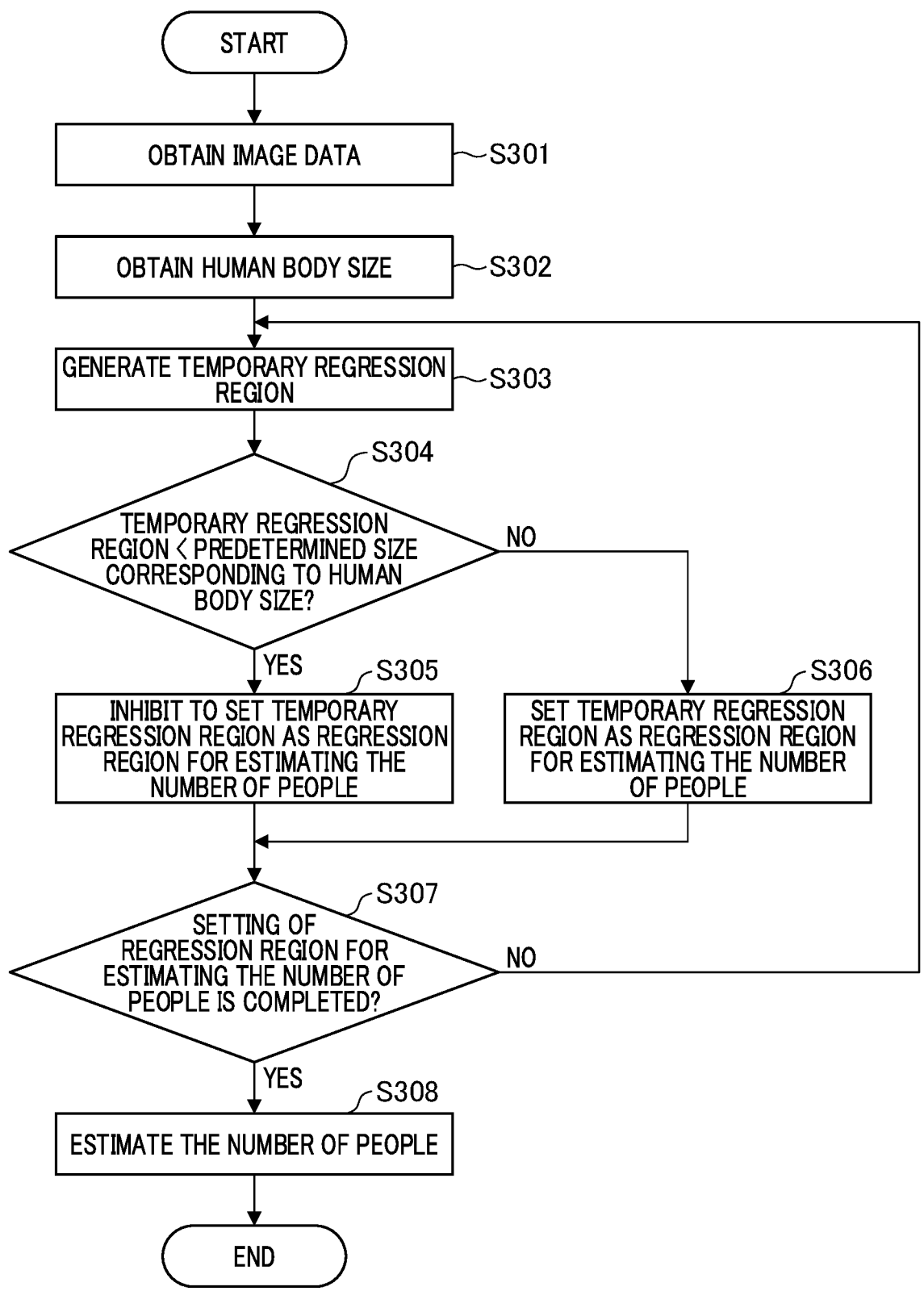
FIG. 3 is a flowchart illustrating a process according to the embodiment of the invention.

FIG. 3 is a flowchart illustrating a process according to the embodiment of the invention, wherein the process is performed by the CPU 10 of the image processing apparatus 100.

In step S301, the image obtain unit 101 obtains an image that is to be used for estimating the number of people.

In step S302, the human body size obtain unit 102 obtains the human body size in the image.

In step S303, the regression region generation unit 103 generates temporary regression regions based on the human body size obtained in step S302.

In step S304, the regression region judge unit 104 judges whether the size of the temporary regression region generated by the regression region generation unit 103 is smaller than the predetermined size, which is calculated by multiplying either a vertical length or a horizontal length of the minimum human body size by the predetermined coefficient.

In step S304, in a case where the size of the temporary regression region is smaller than the predetermined size, which is calculated by multiplying the minimum human body size by the predetermined coefficient, the flow proceeds to step S305.

In step S305, the regression region judge unit 104 inhibit to set the temporary regression region as the regression region for estimating the number of people. In other words, in a case where the size of the temporary regression region is judged to be smaller than the predetermined size calculated based on the minimum human body size, that temporary regression region is not set as the regression region for estimating the number of people.

In step S304, in a case where the size of the temporary regression region is equal to or larger than the predetermined size, which is calculated by multiplying the minimum human body size by the predetermined coefficient, the flow proceeds to step S306.

In step S306, the regression region judge unit 104 sets the temporary regression region as the regression region for estimating the number of people.

In this connection, in step S305, for an image region where the temporary regression region is not set as the regression region for estimating the number of people, a regression region having the predetermined size may be set for estimating the number of people, wherein the predetermined size is calculated by multiplying the predetermined minimum human body size by the predetermined coefficient.

That is to say, for the image region where the size of the temporary regression region is judged to be smaller than the predetermined size, the regression region having the predetermined size may be set for estimating the number of people.

In this connection, although there may be a case where the regression region having the predetermined size may protrude from an image screen as indicated as FIG. 4C or overlaps with another regression region, that may be OK, FIG. 4C will be described in detail later.

As another embodiment, in step S304, in a case where the size of the temporary regression region is smaller than the predetermined size, which is calculated by multiplying the predetermined minimum human body size by the predetermined coefficient, the temporary regression region generated by the regression region generation unit 103 may be expanded to be larger than the predetermined size according to the human body size that can be detected.

In other words, in a case where the size of the temporary regression region is smaller than the predetermined size, a regression region larger than the predetermined size may be set for estimating the number of people, the detail of which will be described later referring to FIG. 5B.

In step S307, in a case where setting of the regression region for estimating the number of people has not been completed, the flow returns to step S303 and the temporary regression region is generated again.

Or, in step S307, in a case where the regression regions for estimating the number of people, which may include the regression region having the predetermined size corresponding to the minimum human body size, have been set with respect to the entire image screen, the flow goes to step S308 and the number of people is estimated with regard to each of the regression regions.

As explained in the above, in the present embodiment, by step S303 to step S307, the regression regions for estimating the number of people are set by dividing the image based on the minimum human body size. In addition, the regression regions smaller than the predetermined size corresponding to the minimum human body size is inhibited to be set as the regression regions for estimating the number of people. Here, step S303 to step S307 functions as a set unit for setting the regression regions for estimating the number of people.

In addition, although human body is counted as a target object, other target object may be counted in a similar way using a process described in the embodiment.

In step S308, the number of people estimate unit 105 estimates the number of people by using the known regression-based human number estimation method with regard to the regression regions set by step S303 to step S307.

The display unit 106 displays a result of the estimation of the number of people performed by the number of people estimate unit 105 with the display apparatus 13.

Although in this embodiment, after the temporary regression regions are generated, the temporary regression region is judged whether to be set as the regression regions for estimating the number of people in step S303, this judgement may be performed before completing generating the temporary regression region.

Figure 4C:
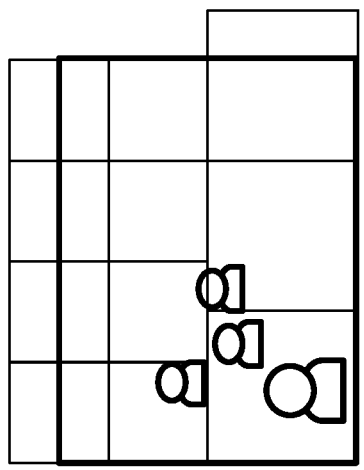
FIG. 4C is a diagram illustrating a case where the size of the temporary regression region 402 is judged to be too small to be set as the regression region for estimating the number of people, so that regression regions for estimating the number of people having a predetermined size are set.
Figure 4B:
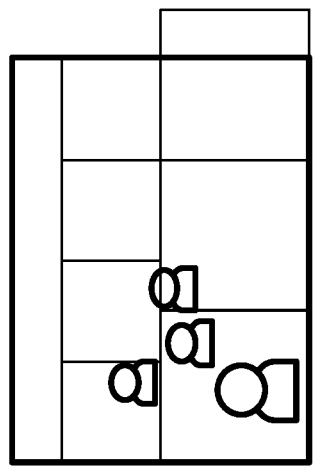
FIG. 4B is a diagram illustrating a case where a size of the temporary regression region 402 is judged to be too small to be set as the regression region for estimating the number of people.
Figure 4A:
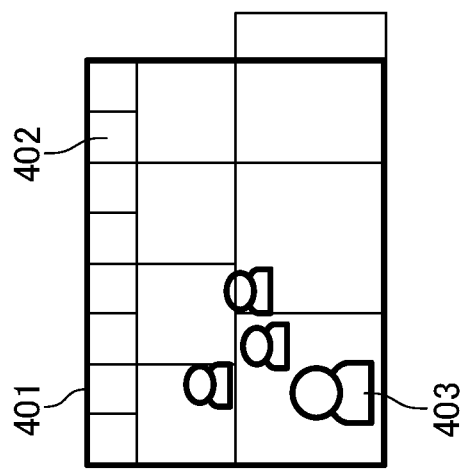
FIG. 4A is a diagram illustrating a case where a temporary regression region is set by a regression region generation unit 103 so as to make a ratio between a size of the temporary regression region and a size of a human body almost constant.

Next, referring to FIGS. 4A, 4B, and 4C, an example of the image 401 is illustrated. Here, FIG. 4A is a diagram illustrating a case where the temporary regression region is set by the regression region generation unit 103 so as to make a ratio between the size of a temporary regression region and the size of a human body almost constant.

FIG. 4B is a diagram illustrating a case where the size of the temporary regression region 402 is judged to be too small to be set as the regression region for estimating the number of people.

In FIGS. 4A, 4B, and 4C, human bodies in foreground looks larger than those in background.

402 denotes the temporary regression region generated by the regression region generation unit 103, 403 denotes the human body included in the image 401.

In FIG. 4A, the temporary regression region 402 is smaller than the predetermined size, which is calculated by multiplying the predetermined minimum human body size by the predetermined coefficient, so that a result in step S304 is Yes and the temporary regression region 402 is inhibited to be set as the regression region for estimating the number of people in step S305.

FIG. 4C is a diagram illustrating a case where the size of the temporary regression region 402 is judged to be too small to be set as the regression region for estimating the number of people, so that regression regions for estimating the number of people having a predetermined size are set.

In FIG. 4C, regression regions for estimating the number of people having a predetermined size, which is calculated by multiplying the predetermined minimum human body size by the predetermined coefficient, are set, so that part of them are overlapped with the upper area of the image.

As illustrated in FIGS. 4A, 4B, and 4C, the human body size in the image is obtained, using the regression regions equal to or larger than the predetermined size corresponding to the predetermined minimum human body size are set for estimating the number of people by dividing the image.

Thus, compared to FIG. 4A, in FIGS. 4B, 4C, the number of the regression region for estimating the number of people can be reduced, so that calculation speed can be increased.

Next, referring to FIGS. 5A and 5B, another embodiment will be described, wherein the temporary regression region are expanded by the regression region judge unit 104.

Figure 5A:
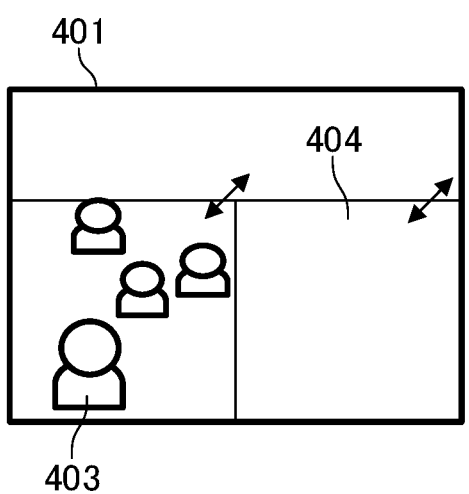
FIG. 5A is a diagram illustrating a case where some of the temporary regression regions generated by the regression region generation unit 103 are expanded.

FIG. 5A is a diagram illustrating a case where some of the temporary regression regions generated by the regression region generation unit 103 shown in FIG. 4A are expanded by the regression radon judge unit 104. For example, assuming that the size of the temporary regression regions generated by the regression region generation unit 103 is 200 px, the ratio of the predetermined human body size to the size of the regression region size is 0.2, and the range of the human body size that can be detected is 0.16 to 0.24, then the human body size detectable from the regression region having a size of 200 px is 32 px to 48 px.

In a case where the human body size in the image varies from 35 px to 40 px, the predetermined minimum human body size is 35 px, and the size of the regression region is expanded to 216 px, detectable human body size is 35 px to 52 px, so that the human body size in the image can be covered.

Therefore, the size of the regression region having a size of 200 px can be expanded to be set as a size of 216 px.

In addition, assume that the predetermined minimum human body size set in advance by a user is 40 px, and as mentioned in the above, the range of the human body size that can be detected is 0.16 to 0.24, even if the size of the regression region is expanded to 250 px, detectable human body size is 40 px to 60 px.

Therefore, the size of the regression region can be expanded from 200 px to 250 px to set based on the predetermined minimum human body size.

As mentioned above, depending on the predetermined minimum human both size to be detected, the size of the regression region for estimating the number of people can be expanded to be set.

Thus, even in a case where the size of the regression region is set to a predetermined maximum size, depending on the predetermined minimum human body size to be detected, by expanding the maximum size for the regression region size, the number of the regression regions can be reduced.

Figure 5B:
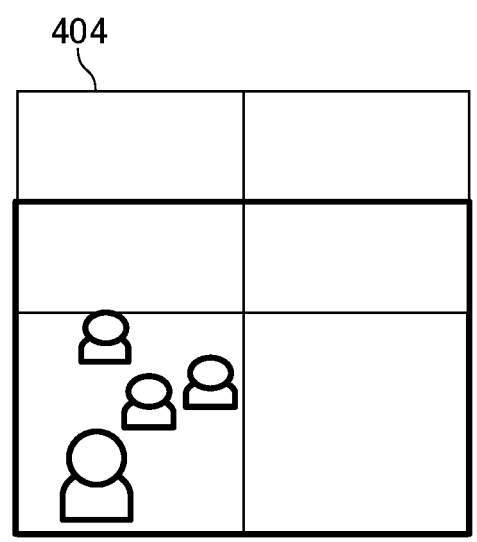
FIG. 5B is a diagram illustrating a case where other temporary regression regions are also expanded to be set as regression regions for estimating the number of people.

FIG. 5B is a diagram illustrating a case where other temporary regression regions that have not been set as the regression regions for estimating the number of people are expanded to be set as regression regions for estimating the number of people, in FIG. 5B, in a case where the temporary regression regions that have not been set as the regression regions for estimating the number of people in step S305 are expanded so that the regression region 404 for estimating the number of people can be set for the image area where the regression regions for estimating the number of people have not been set.

Thus, the number of the regression region can be reduced and estimation of the human body of entire image can be realized.

<Embodiment 2>

In this connection, in the embodiment 1, the temporary regression regions are generated in step S303, the temporary regression regions may not be generated.

For example, by an image recognition or by using the display apparatus 13, the input apparatus 14, and so on, a user may set at least one analyze region for estimating the number of people in the image. Then, for each analyze region, the human body size obtain unit 102 obtains the predetermined minimum human body size.

Subsequently, the regression region generation unit 103 and the regression region judge unit 104 may directly generate the regression region for estimating the number of people based on the minimum human body size of each analyze region.

Here, the minimum human body size of each analyze region may be determined by the human body size obtain unit 102 or by the user.

In this connection, the number of people estimate unit 105 may estimate the number of people by performing the regression process with respect to each analyze region.

Thus, by directly setting the regression region for estimating the number of people after obtaining the minimum human body size in each analyze region, the regression regions can be reduced.

As explained in the above, according to the embodiments, since the set unit is configured to inhibit to set the regression regions, for estimating the number of people, smaller than the predetermined size obtained by multiplying the minimum human body size by the predetermined coefficient, it is possible to reduce the regression regions for estimating the number of people so that calculation load of the CPU 10 can be reduced.

In addition, with regard to the image region where the regression regions for estimating the number of people has not been set, the set unit sets default regression regions having the predetermined size obtained by multiplying the minimum human body size by the predetermine coefficient in one of the embodiments, or sets the expanded regression regions based on the predetermined minimum human body size in another one of the embodiments, so that the regression regions for estimating the number of people (predetermined object) can be reduced and the calculation time for calculating the number of people can be reduced.

In this connection, the predetermined objects to be detected is human bodies in the above embodiments, however, the predetermined object is not limited to the human body, and may be any, for example, animals other than human, automobiles, bicycles, viruses, and so on. By applying the present invention such as the above embodiments, the number of such objects can be efficiently estimated.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

In addition, as a part or the whole of the control according to this embodiment, a computer program realizing the function of the embodiment described above may be supplied to the image processing apparatus through a network or various storage media. Then, a computer (or a CPU, an MPU, or the like) of the image processing apparatus may be configured to read and execute the program. In such a case, the program and the storage medium storing the program configure the present invention.

This application claims the benefit of Japanese Patent Application No. 2019-222310 filed on Dec. 9, 2019, which is hereby incorporated by reference herein in its entirety.

What is claimed is:

1. An image processing apparatus comprising:
at least one processor or circuit configured to function as:
an image obtain unit configured to obtain an image captured by a camera;
a size obtain unit configured to obtain a size of a person in the image;
a set unit configured to divide the image into a plurality of temporary regions based on the size of the person obtained by the size obtain unit, and to set the temporary regions as temporary regression regions;
a determination unit configured to determine not to set the temporary regression region as a regression region for estimating the number of the persons in a case where the determination unit determines that a size of the temporary regression region is smaller than a predetermined minimum size, and to determine to set the temporary regression region as the regression region for estimating a number of persons in a case where the determination unit determines that the size of the temporary regression region is equal or larger than the predetermined minimum size; and
an estimate unit configured to estimate a number of the persons in the regression region, which is set by the determination unit, by using a recognition model obtained by a support vector machine or deep learning for estimating a number of persons in an image.

2. The image processing apparatus according to claim 1, wherein the determination unit sets the regression region having the predetermined minimum size in a case where the temporary regression region is determined to be smaller than the predetermined minimum size.

3. The image processing apparatus according to claim 1, wherein the determination unit sets the regression region having a size larger than the predetermined minimum size in a case where the temporary regression region is smaller than the predetermined minimum size.

4. The image processing apparatus according to claim 1, wherein the estimate unit estimates the number of the persons by using the recognition model obtained by machine learning for estimating a number of persons in an image of a predetermined size to which the regression regions set by the determination unit are resized.

5. The image processing apparatus according to claim 1, wherein the set unit set the temporary regions based on the size of the person so that a ratio between a size of the temporary regression region and the size of the person becomes a predetermined ratio.

6. The image processing apparatus according to claim 1, wherein the size obtain unit is configured to set analyze regions in the image and to obtain the minimum size of the person in each of the analyze regions.

7. An image processing method comprising:
obtaining an image captured by a camera;
obtaining a size of a person in the image;
dividing the image into a plurality of temporary regions based on the size of the person, and for setting the temporary regions as temporary regression regions;
determining not to set the temporary regression region as a regression region for estimating the number of persons in a case where the size of the temporary regression region is determined to be smaller than a predetermined minimum size and to set the temporary regression region as the regression region for estimating a number of the persons in a case where the size of the temporary regression region is determined to be equal or larger than the predetermined minimum size; and
estimating the number of the persons in the regression region, which is set by the determining by using a recognition model obtained by a support vector machine or deep learning for estimating a number of persons in an image.

8. A non-transitory computer-readable storage medium that stores a computer program for image processing apparatus to execute:
obtaining an image captured by a camera;
obtaining a size of a person in the image;
dividing the image into a plurality of temporary regions based on the size of the person and for setting the temporary regions as temporary regression regions;
determining not to set the temporary regression region as a regression region for estimating the number of persons in a case where the size of the temporary regression region is determined smaller than a predetermined minimum size and to set the temporary regression region as the regression region for estimating a number of persons in a case where the size of the temporary regression region is determined to be equal or larger than the predetermined minimum size; and
estimating the number of the persons in the regression region, which is set by the determining by using a recognition model obtained by a support vector machine or deep learning for estimating a number of persons in an image.

* * * * *